United States Patent
Fenny et al.

(10) Patent No.: US 6,236,323 B1
(45) Date of Patent: May 22, 2001

(54) VISUAL FLUID LEVEL INDICATOR USING MAGNETIC PINS

(75) Inventors: Carlos Alexander Fenny, Arlington; Darrel Bill Bryan, Mansfield, both of TX (US)

(73) Assignee: Bell Helicopter TEXTRON Inc., Fort Worth, TX (US)

( * ) Notice: Subject to any disclaimer, the term of this patent is extended or adjusted under 35 U.S.C. 154(b) by 0 days.

(21) Appl. No.: 09/409,333

(22) Filed: Sep. 30, 1999

(51) Int. Cl.[7] .................................................. G08B 21/00
(52) U.S. Cl. ............................ 340/618; 340/624; 73/314; 116/109
(58) Field of Search .................................. 340/618, 623, 340/624; 73/290 R, 305, 314; 116/109, 110

(56) References Cited

U.S. PATENT DOCUMENTS

| 3,964,312 | 6/1976 | Sebek | 73/314 |
| 3,965,317 | * 6/1976 | Gratzmuller | 340/618 |
| 4,289,451 | 9/1981 | Lewis | 417/40 |
| 4,489,224 | 12/1984 | Steer | 200/84 |
| 4,804,944 | * 2/1989 | Golladay et al. | 340/624 |
| 4,870,862 | 10/1989 | Bonetti | 73/322.5 |
| 5,056,049 | * 10/1991 | O'Neill | 340/623 |
| 5,136,884 | 8/1992 | Lovett | 73/313 |

\* cited by examiner

Primary Examiner—Edward Lefkowitz
(74) Attorney, Agent, or Firm—Gardere Wynne Sewell LLP; Sanford E. Warren, Jr.; Kenneth T. Emanuelson

(57) ABSTRACT

A fluid level indicator (22) indicating the level of a fluid (14) in a chamber (12) having a piston (16) is disclosed. The fluid level indicator (12) has a housing (24) that is positioned adjacent to the chamber (12). A plurality of magnetic pins (28, 38) are moveably disposed within the housing (24). The magnetic pins (28, 38) have a first position and a second position. At least one of the magnetic pins (38) shifts from the first position to the second position when the piston (16) is aligned therewith, thereby indicating the position of the piston (16) within the chamber (12) and indicating the level of fluid (14) within the chamber (12).

26 Claims, 3 Drawing Sheets

VISUAL FLUID LEVEL INDICATOR USING MAGNETIC PINS

TECHNICAL FIELD OF THE INVENTION

This invention relates in general to the field of fluid level indicating devices and, in particular to, a fluid level indicator that utilizes a plurality of magnetic pins to visually indicate fluid level in a fluid containing chamber having a piston.

BACKGROUND OF THE INVENTION

Without limiting the scope of the invention, its background will be described with reference to a hydraulic chamber in an aircraft as an example.

In an aircraft hydraulic system, hydraulic fluid supply and pressure is maintained using a hydraulic reservoir. The typical reservoir design incorporates a moving piston in a chamber to accommodate changes in reservoir volume. The reservoir volume will change as a result of temperature fluctuations, system leaks and differential actuator fluid exchange. The piston position in the chamber changes proportional with the change in reservoir fluid level. By measuring the position of the piston in the chamber, the fluid level in the reservoir can be measured.

In one system, fluid level may be indicated using a graduated rod attached to the piston that extends outwardly from the chamber. It has been found, however, that the rod must be equal in length to the entire piston travel in order to provide the required fluid level readings. Due to space limitations in many aircrafts, however, using a rod to indicate fluid level in the hydraulic reservoir is impractical.

To overcome these space constraints, attempts have been made to design a fluid level indicator for the hydraulic reservoir of an aircraft that does not require additional space next to the reservoir piston. For example, in one design, an indicator tube is mounted adjacent to the hydraulic reservoir that has a floating indicator disposed therein. The floating indicator is tied directly to the piston using a pulley and cabling system. It has been found, however, that like the graduated rod level indicator, having the level indicating device attached directly to the piston may induce failures in the reservoir piston if the level indicating device becomes restricted from moving or jammed. Additionally, it has been found that the accuracy of such devices may be affected by the high vibration, high shock loads and high g-forces experienced in certain aircraft.

Therefore, a need has arisen for a fluid level indicator for indicating the level of a fluid in a chamber having a piston. A need has also arisen for such a fluid level indicator that is not physically tied to the reservoir piston. Further, a need has arisen for a such a fluid level indicator that does not require substantial space next to the chamber.

SUMMARY OF THE INVENTION

The present invention disclosed herein provides a fluid level indicator for indicating the level of a fluid in a chamber having a piston. The fluid level indicator of the present invention accurately indicates the level of the fluid in the chamber without being physically connected to the piston and without requiring substantial space next to the chamber. Additionally, the fluid level indicator of the present invention is unaffected by high vibration, high shock loads or high g-forces.

The fluid level indicator comprises a housing that is positioned adjacent to the chamber. Disposed within the housing are a plurality of magnetic pins. The magnetic pins move between a first position and a second position. Springs bias each of the magnetic pins toward the first position. To overcome the spring bias force, a metallic band is wrapped around the piston such that when the piston is aligned with one of the magnetic pins, that magnetic pin is shifted to the second position. A viewing window is attached to the housing such that the position of the magnetic pins may be viewed therethrough, thereby indicating the position of the piston within the chamber and indicating the level of fluid within the chamber.

The viewing window includes indicia specifying the level of fluid in the chamber. The viewing window may be frosted such that magnetic pins in the first position are seen through the viewing window and magnetic pins in the second position are not seen through the viewing window. Alternatively, the viewing window may be clear such that a first color is viewable when the magnetic pins are in the first position and a second color is viewable when the magnetic pins are in the second position. In this embodiment, the magnetic pins each have a polished button attached thereto.

In one embodiment, a booster magnet may be added that contacts the metallic band to increase the force attracting the magnetic pins toward the second position when piston is aligned therewith.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figures 1, 2:
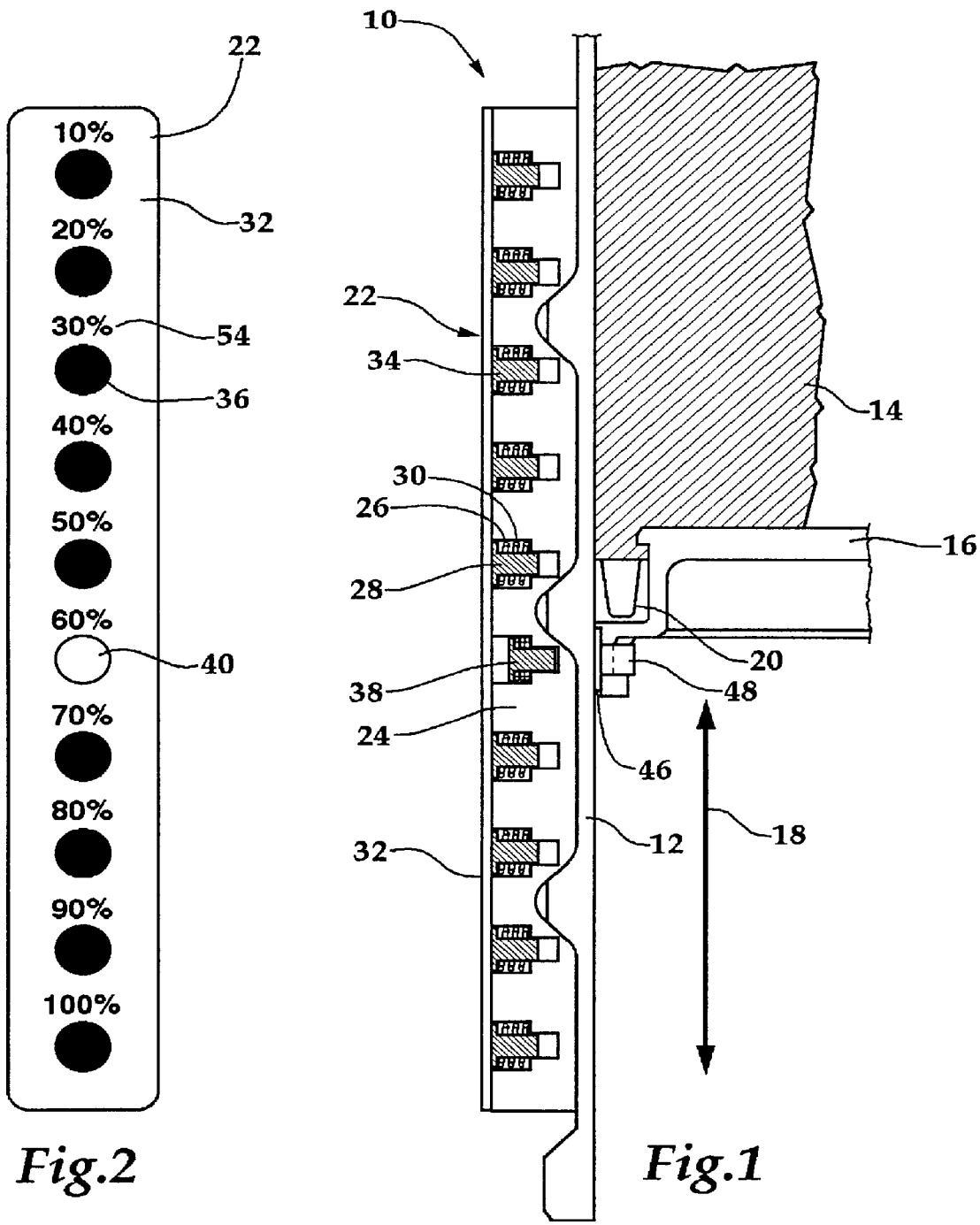
FIG. 1 is a cross sectional view of a fluid level indicator of the present invention attached to a hydraulic fluid chamber.
FIG. 2 is a top view of a fluid level indicator of the present invention.

Referring now to FIG. 1, therein is depicted a reservoir chamber operating a fluid level indicator of the present invention that is generally designated 10. Reservoir chamber 12 may be any typical chamber for containing a fluid 14 which may be a liquid or gas. As the volume of the fluid 14 changes within the chamber 12, a piston 16 travels within the chamber 12 as indicated by the arrow 18. Disposed between the piston 16 and the chamber 12 is a seal 20 that may be a conventional spring energized seal made from butyl rubber or silicon. The chamber 12 is made from a non-magnetic material such as aluminum or plastic and should be selected based upon the required service. Likewise, the piston 16 may be made from a non-magnetic material.

Disposed adjacent to the cylinder 12 is the fluid level indicator 22. The fluid level indicator 22 may be attached to cylinder 12 in a variety of methods. For example, the fluid level indicator 22 may be adhered to the chamber 12 using adhesive. The fluid level indicator 22 has a non-magnetic housing 24 that is preferably a plastic. The housing 24 has a plurality of bores formed therein such as the bore 26. Disposed within each of the bores is a magnetic pin such as the magnetic pin 28 disposed in the bore 26. Also disposed within the bores are springs, such as the spring 30 that biases the magnetic pin 28 in the direction away from the cylinder 12 and against a cover 32.

The cover 32 serves as a viewing window through which the user of the fluid level indicator 22 may visually determine the position of the magnetic pins relative to the cover 32. For example, as best seen in FIG. 2, when the magnetic pins, such as magnetic pin 34, are biased against the cover 32, the user would see a dark area 36 indicating contact between the magnetic pin 34 and the cover 32. Conversely, if a magnetic pin such as the magnetic pin 38 is in the retracted position, the user of the fluid level indicator 22 would see the opened area as indicated at 40. This may be achieved using a cover 32 that comprises a frosted, transparent material such as a frosted plexiglass. In this case, when a magnetic pin is against the cover 32, the ambient light is reflected off the upper surface of the magnetic pin 28, thus allowing the user to view the color of the upper surface of the magnetic pin 28. Because the frosted cover 32 scatters ambient light, the magnetic pins disappear from view if they are moved away from the cover 32.

Figure 3:
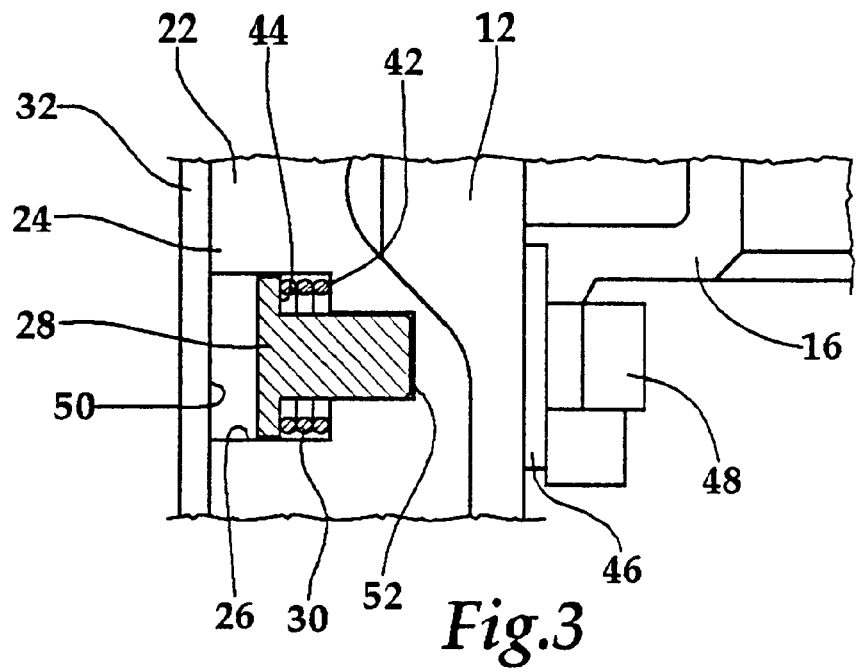
FIG. 3 is a cross sectional view of a magnetic pin of a fluid level indicator of the present invention that is aligned with the piston of the hydraulic chamber.

Now referring to FIG. 3, the magnetic pin 28 is shown in the retracted position within the bore 26 with the spring 30 in a fully compressed position between the surfaces 42, 44. The magnetic pin 28 is placed in the retracted position due to the magnetic attraction between the magnetic pin 28 and a band 46 that is wrapped around the piston 16. The band 46 comprises a material that has a suitable attraction to the magnetic pin 28 such as steel. In addition, a booster magnet 48 may be added to piston 16 to boost the attraction between the band 46 and the magnetic pin 28.

In operation, as the piston 16 moves along the path indicated by the arrow 18, the band 46 becomes aligned with the various magnetic pins. When the band 46 is in alignment with one of the magnetic pins such as magnetic pin 28, the magnetic pin 28 is attracted to the band 46 and shifts from the extended position against the surface 50 of the cover 32 to the retracted position against surface 52 of the housing 22. As such, as the piston 16 moves within the chamber 12, the various magnetic pins are retracted to indicate the level of fluid 14 within the chamber 12 as best seen in FIG. 2.

The cover 32 includes indicia 54 specifying the level of the fluid 14 within the chamber 12. While FIG. 2 depicts ten percent increments between the indicia 54, the fluid level indicator 22 actually provides an indication the level of the fluid 14 within the chamber 12 down to five percent increments. Specifically, as the piston 16 moves between two magnetic pins such as the magnetic pin 38 and the magnetic pin 28, the band 46 along with the booster magnet 48 attract both the magnetic pin 28 and the magnetic pin 38 such that both are retracted. In this case, there would be two open areas such as the open area 40 and the user would average the two values to obtain the accurate reading. For example, if the magnetic pin 28 and the magnetic pin 38 were both retracted, the level of the fluid 14 within the chamber 12 should be read as fifty-five percent.

Figures 4, 5:
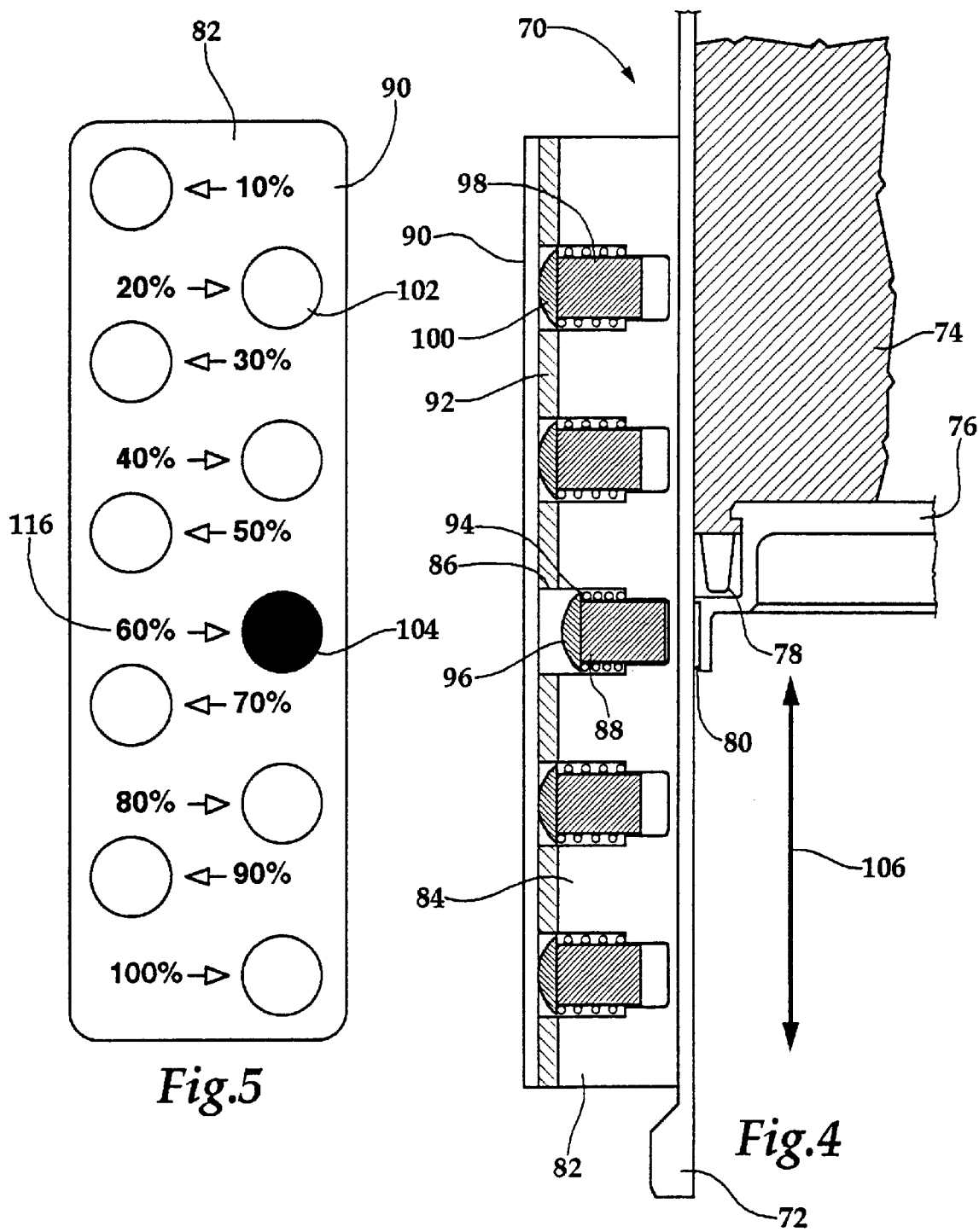
FIG. 4 is a cross sectional view of a fluid level indicator of the present invention attached to a hydraulic fluid chamber.
FIG. 5 is a top view of a fluid level indicator of the present invention.

Turning now to FIG. 4, therein is depicted another embodiment of a fluid level indicator coupled to a reservoir chamber that is generally designated 70. The reservoir chamber 72 has a fluid 74 contained therein and includes a piston 76. A seal is provided between the chamber 72 and the piston 76 by the seal 78. The piston 76 has a band 80 wrapped therearound. Attached to the outer surface of the chamber 72 is a fluid level indicator 82. The fluid level indicator 82 has a housing 84 with a plurality of bores, such as the bore 86. Disposed within the bores are a plurality of magnetic pins, such as the magnetic pin 88. The fluid level indicator 82 includes a cover 90 that is preferably a clear plastic. In addition, the fluid level indicator 82 has a fluorescent plastic layer 92 that is disposed beneath the cover 90. A spring, such as the spring 94, is disposed within each of the bores to bias the magnetic pins toward the cover 90. Each of the magnetic pins includes a domed surface such as domed surface 96 of the magnetic pin 88. The domed surface may be constructed from a polished stainless steel.

As best seen in FIG. 5, when a magnetic pin, such as the magnetic pin 98, is in the extended position, light reflects off of the domed surface 100 as indicated at 102. When a magnetic pin such as the magnetic pin 88 is in the retracted position, however, light reflects off of the domed surface 96 into the fluorescent plastic layer 92 giving an indication as seen at 104. Using fluid level indicator 82, the user may easily view the level of the fluid 74 within the chamber 72 at any angle with respect to the fluid level indicator 82.

Figure 6:
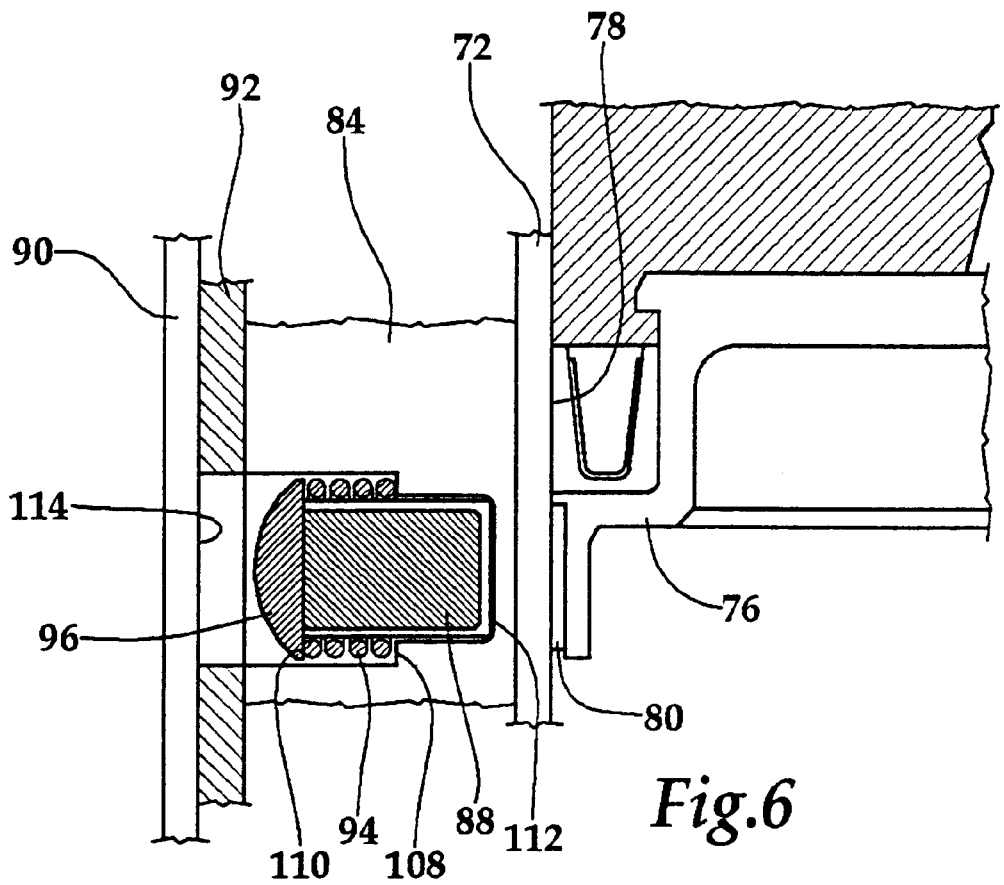
FIG. 6 is a cross sectional view of a magnetic pin of a fluid level indicator of the present invention that is aligned with the piston of the hydraulic chamber.

As the level of the fluid 74 within the chamber 72 changes and the piston 76 moves in the directions indicated by the arrow 106, the various magnetic pins are retracted as they become aligned with the band 80 as best seen in FIG. 6. As such, when band 80 is in alignment with the magnetic pin 88, the spring 94 is compressed between the surfaces 108 and 110 until the magnetic pin 88 contacts the surface 112 of the housing 84. When the band 80 moves out of alignment with the magnetic pin 88, the spring 94 biases the magnetic 88 toward the cover 90 until the domed surface 96 contacts the surface 114 of the cover 90. As such, the level of the fluid 74 within the chamber 72 is indicated using the fluid level indicator 82. Using the indicia 116, as best seen in FIG. 5, the user is quickly able to determine that level. Even though the indicia 116 are shown in increments of ten percent, the fluid level indicator 82 provides resolution down to five percent as the band 80 will attract two magnetic pins when the band 80 is positioned between adjacent magnetic pins.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:

1. A fluid level indicator for indicating the level of a fluid in a chamber having a piston, the fluid level indicator comprising:

a housing positioned adjacent to the chamber; and a plurality of magnetic pins disposed within the housing, each moveable between a more visible first position and a less visible second position, at least one of the magnetic pins shifting from the first position to the second position when the piston is aligned therewith, thereby indicating the position of the piston within the chamber and indicating the level of fluid within the chamber.

2. The fluid level indicator as recited in claim 1 further comprising a plurality of springs each biasing one of the magnetic pins toward the first position.

3. The fluid level indicator as recited in claim 1 further comprising a viewing window attached to the housing such that the position of the magnetic pins may be viewed therethrough.

4. The fluid level indicator as recited in claim 3 wherein the viewing window has indicia specifying the level of fluid in the chamber.

5. The fluid level indicator as recited in claim 3 wherein the viewing window is frosted such that magnetic pins in the first position are seen through the viewing window and magnetic pins in the second position are not seen through the viewing window.

6. The fluid level indicator as recited in claim 3 wherein the viewing window is clear such that a first color is viewable when the magnetic pins are in the first position and a second color is viewable when the magnetic pins are in the second position.

7. The fluid level indicator as recited in claim 6 wherein the magnetic pins each have a polished button attached thereto.

8. The fluid level indicator as recited in claim 1 further comprising a metallic band wrapped around the piston that attracts the magnetic pins toward the second position when piston is aligned therewith.

9. The fluid level indicator as recited in claim 8 further comprising a booster magnet contacting the metallic band to increase the force attracting the magnetic pins toward the second position when piston is aligned therewith.

10. The fluid level indicator as recited in claim 1 wherein the fluid is a liquid.

11. The fluid level indicator as recited in claim 1 wherein the fluid is a gas.

12. A fluid level indicator for indicating the level of a fluid in a chamber having a piston, the fluid level indicator comprising:

a housing positioned adjacent to the chamber;

a plurality of magnetic pins disposed within the housing, each moveable between a more visible first position and a less visible second positions;

a plurality of springs each biasing one of the magnetic pins toward the first position; and a metallic band wrapped around the piston that attracts the magnetic pins toward the second position when piston is aligned therewith, thereby indicating the position of the piston within the chamber and indicating the level of fluid within the chamber.

13. The fluid level indicator as recited in claim 12 further comprising a booster magnet contacting the metallic band to increase the force attracting the magnetic pins toward the second position when piston is aligned therewith.

14. The fluid level indicator as recited in claim 12 further comprising a viewing window attached to the housing such that the position of the magnetic pins may be viewed therethrough.

15. The fluid level indicator as recited in claim 14 wherein the viewing window has indicia specifying the level of fluid in the chamber.

16. The fluid level indicator as recited in claim 14 wherein the viewing window is frosted such that magnetic pins in the first position are seen through the viewing window and magnetic pins in the second position are not seen through the viewing window.

17. The fluid level indicator as recited in claim 14 wherein the viewing window is clear such that a first color is viewable when the magnetic pins are in the first position and a second color is viewable when the magnetic pins are in the second position.

18. The fluid level indicator as recited in claim 17 wherein the magnetic pins each have a polished button attached thereto.

19. A fluid level indicator for indicating the level of a fluid in a chamber having a piston, the fluid level indicator comprising:

a housing positioned adjacent to the chamber;

a plurality of magnetic pins disposed within the housing, each moveable between a more visible first position and a less visible second position, at least one of the magnetic pins shifting from the first position to the second position when the piston is aligned therewith; and a viewing window attached to the housing such that the position of the magnetic pins may be viewed therethrough, thereby indicating the position of the piston within the chamber and indicating the level of fluid within the chamber.

20. The fluid level indicator as recited in claim 19 further comprising a plurality of springs each biasing one of the magnetic pins toward the first position.

21. The fluid level indicator as recited in claim 19 wherein the viewing window has indicia specifying the level of fluid in the chamber.

22. The fluid level indicator as recited in claim 19 wherein the viewing window is frosted such that magnetic pins in the first position are seen through the viewing window and magnetic pins in the second position are not seen through the viewing window.

23. The fluid level indicator as recited in claim 19 wherein the viewing window is clear such that a first color is viewable when the magnetic pins are in the first position and a second color is viewable when the magnetic pins are in the second position.

24. The fluid level indicator as recited in claim 23 wherein the magnetic pins each have a polished button attached thereto.

25. The fluid level indicator as recited in claim 19 further comprising a band wrapped around the piston that attracts the magnetic pins toward the second position when piston is aligned therewith.

26. The fluid level indicator as recited in claim 25 further comprising a booster magnet contacting the metallic band to increase the force attracting the magnetic pins toward the second position when piston is aligned therewith.

* * * * *